(12) United States Patent
Zweig et al.

(10) Patent No.: US 8,086,535 B2
(45) Date of Patent: Dec. 27, 2011

(54) DECOUPLING RIGHTS IN A DIGITAL CONTENT UNIT FROM DOWNLOAD

(75) Inventors: Jonathan M. Zweig, Cupertino, CA (US); James H. Woodyatt, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 699 days.

(21) Appl. No.: 11/397,149

(22) Filed: Apr. 4, 2006

(65) Prior Publication Data

US 2007/0233606 A1   Oct. 4, 2007

(51) Int. Cl.
*G06Q 99/00* (2006.01)

(52) U.S. Cl. ........... 705/53; 705/50; 705/51; 705/57; 705/59; 705/64; 713/155; 380/200; 380/201; 380/202; 380/203; 726/26; 726/27; 726/28; 726/29; 726/30

(58) Field of Classification Search .......... 705/50–59; 713/155; 380/200–203; 726/26–33
See application file for complete search history.

(56) References Cited

U.S. PATENT DOCUMENTS

| | | | |
|---|---|---|---|
| 5,892,900 A | 4/1999 | Ginter | |
| 6,574,609 B1 | 6/2003 | Downs et al. | |
| 6,983,371 B1 | 1/2006 | Hurtado et al. | |
| 6,990,584 B1 | 1/2006 | Yoshiura et al. | |
| 7,062,500 B1 * | 6/2006 | Hall et al. | 707/102 |
| 7,213,005 B2 | 5/2007 | Mourad et al. | |
| 7,249,107 B2 * | 7/2007 | Yaacovi | 705/59 |
| 7,546,532 B1 | 6/2009 | Nichols et al. | |
| 2003/0125964 A1 | 7/2003 | Chang et al. | |
| 2004/0196972 A1 | 10/2004 | Zhu et al. | |
| 2005/0283791 A1 | 12/2005 | McCarthy et al. | |
| 2006/0048223 A1 | 3/2006 | Lee et al. | |
| 2007/0233602 A1 | 10/2007 | Zweig et al. | |
| 2008/0148069 A1 * | 6/2008 | Tsuria et al. | 713/193 |
| 2009/0048978 A1 * | 2/2009 | Ginter et al. | 705/51 |
| 2010/0106658 A1 * | 4/2010 | Stefik et al. | 705/310 |

OTHER PUBLICATIONS

International Search Report, PCT/US07/65771, 4 pages, Dec. 21, 2007.

* cited by examiner

*Primary Examiner* — Jalatee Worjloh
(74) *Attorney, Agent, or Firm* — Dorsey & Whitney LLP

(57) ABSTRACT

Systems and methods for enabling a user to obtain rights in a legitimate copy of a digital content unit without downloading the copy from a digital content store are provided. The systems and methods provide an encrypted copy of a digital content unit to a first user and transcript the encrypted copy to generate the legitimate copy to a second user. The encrypted copy is encrypted with a first encrypt key that may be associated with the first user and the legitimate copy is encrypted with a second encrypt key that may be associated with the second user.

9 Claims, 5 Drawing Sheets

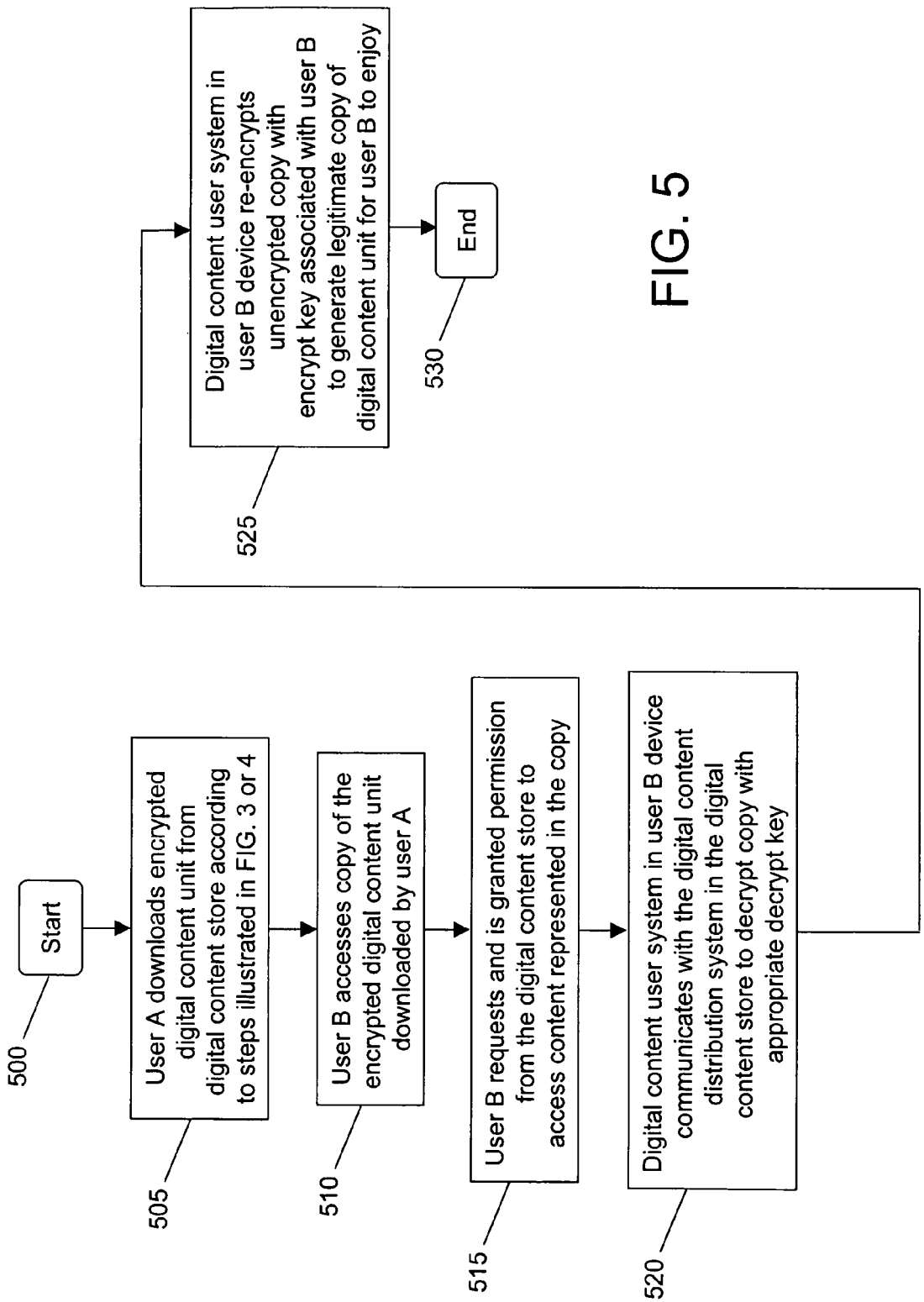

DECOUPLING RIGHTS IN A DIGITAL CONTENT UNIT FROM DOWNLOAD

FIELD OF THE INVENTION

The present invention relates generally to digital content protection and, more particularly, to cryptographic techniques for obtaining a right in a legitimate copy of a digital content unit without downloading the copy.

BACKGROUND INFORMATION

The explosion of the Internet has revolutionized the ways in which information is disseminated and shared. Users are no longer tied to the basic newspaper, television and radio distribution formats and their respective schedules to receive their written, auditory, or visual information. Likewise, users no longer need to obtain information or data stored in a so-called "hard" or physical format, such as on a compact disk (CD) or digital versatile disk (DVD). At any given time, massive amounts of information are exchanged electronically by millions of users worldwide using the Internet not only for communication but also for research, education, business, and entertainment. Information can now be downloaded, streamed or delivered directly to computer desktops, laptops, set-top boxes, entertainment units, personal digital assistants ("PDAs"), wireless telephones, digital music players, and other portable devices, providing virtually unlimited information access to users.

This information is often disseminated as digital content in the form of digital content "units" or files, such as audio, video, graphics, or multimedia files, that may be shared by users, devices, and networks. For example, users may now listen to audio broadcasts and live music concerts on various web sites or download and play audio files as desired. The audio files may be downloaded from digital content stores, which are basically repositories of digital content units available for user access. Often a per unit fee or subscription is charged for access to digital content units. Examples of digital content stores offering audio downloads and other multimedia services include the iTunes Music Store, operated by Apple Computer, Inc., of Cupertino, Calif., the Yahoo! Music Store, operated by Yahoo!, Inc., of Sunnyvale, Calif., the Napster™ web site operated by Napster, Inc., of Los Angeles, Calif., Rhapsody™, the Rhapsody™ music services operated by RealNetworks, Inc., of Seattle, Wash., and the eMusic web site, available from eMusic.com, Inc., of New York, N.Y., among others. Such digital content stores are now a staple of the Internet and have fundamentally altered the way digital content is distributed and enjoyed by users everywhere. The iTunes Music Store, for example, has already sold more than 1 billion audio files to users.

Likewise, digital content units may be transmitted across satellite, cable or wireless networks. Digital content units may be provided to televisions, radios and stereos, and so forth by various content providers. Digital content units may, in some cases, be stored locally by a user on a hard disk or other storage medium connected to a network. As one example, a digital video recorder may be connected to a satellite or cable network and store digital content units for later review.

The proliferation of digital content and the ease with which it is created, manipulated, copied, and distributed has led to new challenges for digital content creators, owners, and providers. Those having vested interests in the content have to be especially careful in determining the best means to effectively manage the distribution, use and monitoring of their digital content assets and protect them from piracy. Digital content assets are protected by copyright laws, but those laws merely punish, not necessarily prevent the unauthorized copy, manipulation and distribution of digital content.

To address this concern, content protection technologies have to be deployed. Content protection technologies are those technologies used to monitor and control access to digital content. For example, a digital content store such as the iTunes Music Store may deploy these technologies to ensure that digital content units obtained from its store will not be improperly resold, redistributed or copied by unauthorized users. When a user obtains one or more digital content units from a digital content store, the digital content units may be protected so that only the purchasing user is granted the right to access the digital content units. Content protection technologies employed by the digital content store can prevent the other user from accessing the digital content unit. For example, they can prevent the other user from listening to an audio file obtained by the purchasing user.

Content protection technologies typically use technical and legal mechanisms to protect digital content against unauthorized use. The technical mechanisms may involve cryptographic techniques for securing the digital content, rights thereto, and content distribution. They may also involve the use of "Digital Rights Management" ("DRM") technologies for protecting the rights and interests in distributing or accessing the digital content. "Rights" may include, for example, the right to view the digital content unit, the right to make copies of the digital content unit, the right to redistribute the digital content unit, to publicly display the digital content unit, to modify or sample the digital content unit, to create derivative works of the digital content unit, and so forth. Essentially, "rights" as used herein may include one or more rights common under United States and foreign copyright law. Further, such rights may be restricted or unlimited. As yet another example, a right may be restricted as to the location in which the right may be exercised, the number of times the right may be exercised, to a particular timeframe in which the right may be exercised, the way in which the right may be exercised, and so on.

Cryptographic techniques apply mathematical and/or linguistic principles to secure a given digital content unit. A digital content unit may be encrypted prior to its distribution to a user, i.e., converted into an unreadable format, and decrypted to recover the digital content in its original form for the user to access. The encryption and decryption process may be controlled by the use of a key, which dictates how the unreadable format is produced and decoded. There are three broad types of cryptographic techniques available today for protecting digital content: secret key (or symmetric) techniques, public key (or asymmetric) techniques, and hash function techniques. (Although hash techniques are not cryptographic techniques per se, they are included herein for purposes of the following discussions.) These techniques may be used separately or in combination, such as in a public key/secret key hybrid technique or a key and hash technique. Such techniques may be layered, with credentials at one level protecting different credentials at another (lower) level. "Credentials" are elements or items used to access protected data, be it another credential or digital content. Keys are one example of credentials. As used herein, the term "key" is understood to have the broader meaning of a credential.

Secret key techniques involve the use of a single and secret key for both encryption and decryption. The secret key must be known to both the sender and the receiver, which may present a challenge in how the key itself is to be distributed and protected from others. Common secret key techniques include the Data Encryption Standard ("DES") and its successor, the Advanced Encryption Standard ("AES"), among others.

Public key techniques involve the use of two keys—one for encryption and the other for decryption—that are generally mathematically related so that knowledge of one key does not allow the other key to be easily determined. One key is designated a public key and may be distributed and advertised to anyone while the other key is a private and secret key known only to its holder. One advantage of public key techniques is that they may be used to authenticate the sender of a digital content unit. For example, if Alice encrypts a digital content unit using her private key and sends the encrypted digital content unit to Bob, Bob may decrypt the encrypted digital content unit using only Alice's public key, confirming that Alice was the one who sent the encrypted digital content unit to Bob. Common public key techniques include the Public Key Cryptographic Standards ("PKCSs") and the RSA algorithm, designed by RSA Security, Inc., of Bedford, Mass.

Hash techniques are one-way cryptographic techniques involving the generation of a mathematical function derived from the digital content in a given digital content unit, referred to as a hash function, that makes it difficult for the digital content to be recovered. These techniques are typically used to provide a measure of the integrity of a file, i.e., to verify whether a given digital content unit has been altered. Since two different digital content units typically do not generate the same hash function, knowing the hash function for a particular digital content permits comparison of the hashed content to the unhashed content. This, in turn, may give an indication of whether the digital content unit has been modified. Hash functions may be used together with secret key and public key techniques as a way to further ensure the integrity of a digital content unit. Common hash functions include the Message Digest ("MD") algorithms such as MD2, MD5 and RIPEMD as well as the Secure Hash Algorithm ("SHA").

An example of a common content protection technology relying on cryptographic techniques to protect digital content includes the Content Protection for Prerecorded Media ("CPPM") technology for protecting digital content stored on prerecorded digital versatile disks ("DVD"). CPPM selectively encrypts disc sectors that can only be decrypted during playback by licensed products, such as DVD players. Critical information, e.g., decryption keys, required to unlock the digital content stored in the prerecorded DVDs is located in protected regions of the discs accessible only to the licensed products and under carefully regulated circumstances. Without these keys the encrypted digital content is unusable. Performing bit-for-bit duplication or simply copying files from the protected DVD to a writable DVD, hard drive or other storage medium is prohibited unless the DVD's key is known. Writable DVD products employ several safety safeguards to prevent valid decryption keys from ever being written to these discs. In addition, software for watching DVDs is generally "trusted," such that it does not allow a user to watch an unauthorized copy of a DVD (i.e. one lacking the decryption key).

Additional examples of common content protection technologies relying on cryptographic techniques include the "Fairplay" scheme used by digital content stores, such as the iTunes Store. Digital content stores may use a hybrid of secret key and public key techniques to protect their digital content, or may employ multiple keys. They may also use hash techniques in combination with, say, a hybrid secret key/public key technique.

For example, in the Fairplay system, two keys are used to protect a digital content unit. When a user obtains a digital file from the iTunes Store (possibly through purchase), the user downloads an encrypted audio file that has been encrypted with a random key. The random key is stored in a header of the digital content unit; this header is encrypted with an encryption key specifically linked to the user. Thus, the user's key may be used to decrypt the header of the digital content unit and retrieve the random key, which may then decrypt the remainder of the digital content unit. In this manner, each digital content unit is randomly encoded throughout the majority of its length with a different random key. This makes it difficult for a third party who obtains copies of multiple digital content units associated with a single, legitimate user to guess or derive that legitimate user's personal key. This, in turn, may reduce the unauthorized copying and/or distribution of digital content units.

Because digital content files may be storage and bandwidth intensive, downloads of a digital content unit from a digital content store may take substantial time depending on the characteristics of the network and user demand for the digital content unit during the downloads. For example, a 6 gigabyte movie stored on a DVD may require multiple hours to download across a typical high-speed Internet connection. Users having access to an already legitimately-obtained copy of a given digital content unit, e.g., Bob in the example above having access to the audio file obtained by Alice, may be enticed to find a way to circumvent the content protection technologies and illegally copy without incurring the costs and download time required for purchasing their own copy from the digital content store. By contrast, copying one or more digital content units from a storage medium (including, for example, a CD, DVD, hard disk, flash memory, portable hard disk and so forth) directly to a second storage medium associated with a computer is typically much faster than downloading the same digital content unit(s) across a network connection. Likewise, digital content may be rapidly shared between computers across a wired or wireless local area network (LAN).

In addition to enhancing currently available content protection technologies to protect digital content units from illegal break-ins, it would also be desirable to provide users having access to already legitimately-obtained copies of digital content units a legal right to play, view, or manipulate those copies. Besides savings in download times (and potentially monetary costs) for those users having access to already legitimately-obtained copies, such measure may diminish desire to produce illegal copies of digital content units obtained from a digital content store.

There is therefore a need to provide systems and methods for granting users a legal right to own a copy of a digital content unit without having to obtain or download another copy of the same digital content unit from a digital content store.

There is yet a further need to provide systems and methods for decoupling the purchasing of rights in a copy of a digital content unit from the downloading of the digital content unit.

SUMMARY OF THE INVENTION

In view of the foregoing, a general object of the present invention is to provide systems and methods for granting users a right in a copy of a digital content unit without having to download another copy of the same digital content.

In one aspect, the present invention provides systems and methods for transcrypting or converting a digital content unit encrypted with a given key into a decryptable copy of the digital content unit for a user having a legal right to obtain a copy of the digital content unit.

In another aspect, the present invention provides systems and methods for decoupling the purchasing of rights in a copy of a digital content unit from the downloading of the digital content unit.

These and other aspects of the present invention are accomplished by providing systems and methods for enabling a user to obtain a right or rights in a legitimate copy of a digital content unit without having to download the copy from, for example, a digital content store. A digital content unit, as generally referred to herein, may be any unit or file representing and storing digital content such as plain data, audio, video, graphics, or other multimedia content, that may be shared across users, devices, and networks. A digital content store, as generally referred to herein, may be any repository of digital content units available for user access often on a per unit fee or subscription basis. Such a store may sell, for example, audio, video, combinations of both, computer software, databases, and any other data that may be digitally stored and transmitted.

The present invention is equally applicable to situations where a user has obtained a digital content unit and one or more rights therein, and wishes to copy the digital content unit as provided for within those rights. For example, a user may wish to (and have the right to) make a copy of a CD or DVD, perhaps for backup or archival storage. As yet another example, a user may obtain a CD, DVD, or digital content unit stored on a hard disk or flash memory from the digital content unit's owner, and be asked to make a copy of the digital content unit for the owner. Generally, many digital content units stored on CDs, DVDs, and other storage media are difficult to copy due to copy protection schemes, even if such copying is permitted by the user's rights.

Further, in some cases, such digital content units are not copy-protected, and so making copies (authorized or unauthorized) is particularly simple. Embodiments of the present invention may be likewise applicable to this situation.

The digital content store may have a digital content distribution system for handling the distribution of digital content units to users on various user devices capable of accessing the digital content represented in the digital content units for the users to enjoy. The user devices may be, for example, computer desktops, laptops, set-top boxes, entertainment units, personal digital assistants ("PDAs"), wireless telephones, digital music players, and other portable devices capable of playing, displaying, and performing other actions on the digital content represented in the digital content units. A user device may have a digital content user system capable of receiving digital content units from the digital content store and enabling its users to enjoy the digital content represented in the digital content units. Accordingly, the digital content distribution system in the digital content store communicates with the digital content user system in the user device to transmit/receive digital content unit information to/from users.

In one exemplary embodiment, content protection technologies applying cryptographic techniques are employed by the digital content distribution system in the digital content store to protect the digital content units available therein for access by users. The content protection technologies generally involve encrypting each digital content unit with an encrypt key to generate an encrypted digital content unit for access by a user. The user may access the encrypted digital content unit by paying a monetary fee for the digital content unit or as part of a subscription in which the user has access to a given number of digital content units for a prescribed period of time within a given subscription fee. The user may also be granted access to the digital content unit without having to pay any fees. The encrypt key may be related to the digital content unit, associated with the user authorized to access the encrypted digital content unit and/or associated with the digital content store. The content protection technologies employed by the digital content store may involve a combination of secret key, public key and/or hash techniques to protect the digital content units available therein.

According to this exemplary embodiment, the user accessing an encrypted digital content unit may download the encrypted digital content unit to a user device. The digital content user system in the user device may include a trusted software, e.g., a trusted client software, that is able and authorized by the digital content store to access the digital content in the digital content unit. A trusted software, as generally referred to herein, may be any software that operates as expected within its design and policy and is intended for authorized and trusted users only. A trusted user, as generally referred to herein, may be a user authorized to use the trusted software and who does not and is not able to make unauthorized use of the software, make unauthorized attempts to break into the trusted software or offer it illegally to other untrusted users.

The digital content in the digital content unit may be accessed with the trusted software by first decrypting the digital content unit with a key authorized only for that user. The key may be a secret key associated with the user and/or a key associated with the software authorized for use only by that user. For example, the user may download the encrypted digital content unit to devices such as computer desktops, laptops, set-top boxes, entertainment units, personal digital assistants ("PDAs"), wireless telephones, digital music players, and other portable devices capable of playing, displaying, and performing other actions on the digital content represented in the digital content unit. Each device may be equipped with a software capable of accessing the digital content unit only by the user authorized and entitled to do so, e.g., the user who obtained and downloaded the digital content unit from the digital content store.

In another exemplary embodiment, each encrypted digital content unit may include an unencrypted header therein. In this exemplary embodiment, each digital content unit in the digital content store is encrypted with a unique key based on the header and a secret key associated with a user. The unique key may be, for example, a cryptographic hash of the header and the secret key associated with the user. The digital content in the encrypted digital content unit may be accessed by the user authorized to do so by first generating a decrypt key based on the header and the secret key associated with the user. The decrypt key may be, for example, generated as the cryptographic hash of the header and the secret key associated with the user. Because the header is unique to each digital content unit, each digital content unit is encrypted with a unique key, even for the same user.

In this embodiment, the digital content user system residing in the user device authorized by the digital content store to access the digital content in the encrypted digital content unit may include an untrusted software, e.g., an untrusted client software. An untrusted software, as generally referred to herein, may not guarantee that all of its users are trusted users, that is, the untrusted software may not guarantee that it is fully protected against unauthorized use, distribution, break-ins and other unauthorized actions. In this case, encrypting each digital content unit with a different key, regardless of whether it is for a single user, may further protect the encrypted digital content unit from being prey to unauthorized uses of the untrusted software.

Each time a user purchases and/or downloads an encrypted digital content unit, a different decrypt key is generated. The decrypt key, which may be generated as the cryptographic hash of the header associated with the encrypted digital content unit and the secret key associated with the user, may be generated by the digital content store and provided to the user authorized to download the digital content unit together with the encrypted digital content unit or it may generated by the untrusted software residing in the user device authorized by the digital content store to access the digital content in the digital content unit.

In both these exemplary embodiments, i.e., in the case of a trusted software or an untrusted software, a user having access to a copy of an encrypted digital content unit intended for another user, e.g., a purchasing user, may be granted a legal right to access the copy without having to download another copy of the encrypted digital content unit from a digital content store. The user having access to the copy of the encrypted digital content unit may be able to access the digital content therein by requesting permission to do so from the digital content store wherefrom the encrypted digital content unit was obtained by the other user, e.g., the purchasing user.

For example, the digital content store may offer users the right to purchase a legitimate copy of a digital content unit without downloading it. The users having access to a copy of an encrypted digital content unit may purchase (or otherwise legitimately obtain) such right from the digital content store in order to access the digital content in the copy. Because the encrypted digital content unit was encrypted and authorized solely for the user purchasing and/or downloading it from the digital content store, the user merely having access to a copy of that encrypted digital content unit may, when purchasing the right to access the digital content therein, purchase the right to decrypt the copy for his/her own use. This way, if Alice, for example, purchases an encrypted digital content unit from the digital content store and Bob has access to a copy of the encrypted digital content unit obtained by Alice, Bob will be able to obtain from the digital content store the legal right to access the copy. Bob will be able to decrypt the copy of the encrypted digital content unit for his enjoyment even though the encrypted digital content unit was encrypted with a key associated with Alice. Bob will be able to access the digital content in the copy without having to download another copy from the digital content store.

In the one exemplary embodiment involving a trusted software, a user having a trusted client software in a user device and having access to a copy of an encrypted digital content unit is given the right to decrypt the copy of the encrypted digital content unit with the key able to decrypt the encrypted digital content unit. The key able to decrypt the encrypted digital content may be, for example, a key associated with the user who purchased and/or downloaded the encrypted digital content unit from the digital content store. Because this decrypt key is known to the digital content store, the trusted client software may, for example, retrieve the decrypt key from the digital content store, decrypt the copy with the decrypt key and re-encrypt the copy with a key associated to the user having access to the copy. In the Alice-Bob example above, with Alice purchasing and/or downloading the encrypted digital content unit from the digital content store, Bob having access to a copy of the encrypted digital content unit, and the encrypted digital content unit being encrypted with a key associated with Alice, the trusted client software in Bob's device may obtain Alice's decrypt key from the digital content store, decrypt the copy with Alice's decrypt key and re-encrypt the copy with Bob's key for Bob to enjoy.

In the other exemplary embodiment involving an untrusted software, when the encrypted digital content unit has a unique unencrypted header associated with it, the user having access to a copy of the encrypted digital content unit may, when obtaining a right from the digital content store to access the digital content in the copy without having to download another copy of the encrypted digital content unit from a digital content store, retrieve the unencrypted header from the copy and provide it to the digital content store in order to obtain from the digital content store the key to decrypt the copy. For example, the encrypted digital content unit may be encrypted with a unique key based on the header and a secret key associated with the user who purchased and/or downloaded the encrypted digital content store from the digital content store, e.g., Alice. The unique key may be, for example, a cryptographic hash of the header and the secret key associated with that user, e.g., Alice.

Because the digital content store knows the secret key associated with the user who purchased and/or downloaded the encrypted digital content store from the digital content store, the digital content store may, when provided the unencrypted header associated with the copy of the encrypted digital content by the user having access to the copy, generate the key for decrypting the copy by computing the cryptographic hash of the header and the secret key associated with the user who purchased and/or downloaded the encrypted digital content store from the digital content store. The digital content store may provide this decrypt key to the user having access to the copy, e.g., Bob, so that the client software in the user's device may decrypt the copy for that user to enjoy. Similar to the embodiment involving the trusted software, the digital content store may provide the decrypt key to the untrusted software residing in the user device of the user having access to the copy, e.g., Bob's device, or the untrusted software may retrieve the decrypt key therefrom. The untrusted software may then decrypt the copy with the decrypt key, e.g., the decrypt key associated with Alice, and re-encrypt it with an encrypt key associated to the user having access to the copy, e.g., with the encrypt key associated with Bob.

Advantageously, the systems and methods of the present invention enable users to have one or more rights in a legitimate copy of a digital content unit without having to purchase or download another copy of the same digital content unit from a digital content store. Further, the systems and methods of the present invention enable digital content stores to decouple the acquisition of rights in a legitimate copy of a digital content unit from the downloading of the digital content unit.

BRIEF DESCRIPTION OF THE DRAWINGS

The accompanying drawings, which are somewhat schematic in some instances and are incorporated in and form a part of this specification, illustrate several embodiments of the invention and, together with the description, serve to explain the principles of the invention.

FIG. 5 is a flowchart of an exemplary embodiment for providing one or more rights in a legitimate copy of a digital content unit to a user without the user having to download the digital content unit from a digital content store.

DETAILED DESCRIPTION OF EMBODIMENTS OF THE INVENTION

Exemplary Environment and Embodiment

Figure 1:
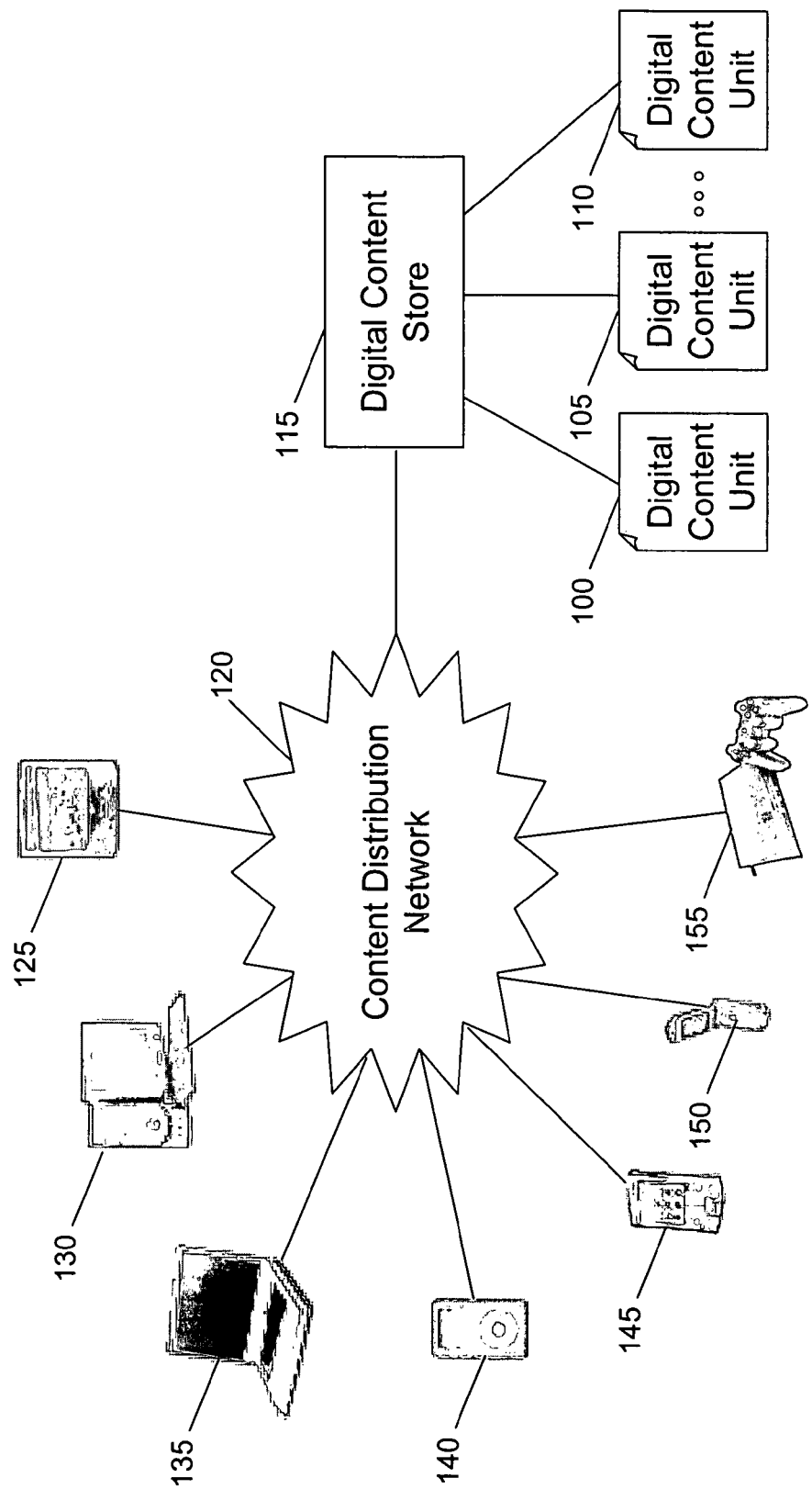
FIG. 1 shows a schematic diagram of an exemplary environment in which the systems and methods of the present invention operate.

A schematic diagram of an exemplary environment for an exemplary embodiment of the present invention is illustrated in FIG. 1. Generally, in accordance with exemplary embodiments of the present invention, systems and methods are provided for enabling a user to have one or more rights in a legitimate copy of a digital content unit without having to download the copy from, for example, a digital content store. A digital content unit, such as digital content units 100, 105 and 110, may be any unit or file representing and storing digital content such as plain data, audio, video, graphics, or other multimedia content, that may be shared across users, user devices, and networks.

Digital content store 115 may be any repository of digital content units available for user access. Examples of digital content stores include the iTunes Music Store, available from Apple Computer, Inc., of Cupertino, Calif., the Yahoo! Music Store, available from Yahoo!, Inc., of Sunnyvale, Calif., the Napster™ web site available from Napster, Inc., of Los Angeles, Calif., Rhapsody™, the digital music service available from RealNetworks, Inc., of Seattle, Wash., and the eMusic web site, available from eMusic.com, Inc., of New York, N.Y., among others. Further, a television, radio, or Internet broadcast (such as a podcast) may be part of, or affiliated with, a digital content store. It should be noted that the entity providing the digital content unit (such as a broadcaster or distributor) may be separate from the entity providing access to or operating the digital content store. Digital content units 100, 105 and 110 may be available to users on a per unit fee or as part of a subscription for example, users may have access to a given number of digital content units (or unlimited access) for a prescribed period of time within a given subscription fee. Users may also be granted access to digital content units 100, 105, and 110 without having to pay any fees.

Digital content store 115 may distribute digital content units 100, 105, and 110 to users via content distribution network 120. Content distribution network 120 may be any information network capable of transmitting digital content information among multiple parties, for example, content distribution network 120 may be the Internet or any other wired or wireless network of varying reach such as a LAN, a wide area network, satellite network, cable network, and so on. Such networks may include, for example, radio, television, and other media networks presently known or hereafter discovered.

Digital content store 115 generally facilitates the distribution of digital content units 100, 105, and 100 to users on various user devices capable of accessing the digital content represented in digital content units 100, 105, and 110. The user devices may be, for example, a television and entertainment unit 125, computer desktop 130, laptop 135, personal multimedia player 140, personal digital assistant 145 or other handheld computing device, wireless telephone 150, video game and entertainment unit 155, or any other device capable of playing, displaying, and performing other actions on the digital content represented in digital content units 100, 105, and 110.

Figure 2:
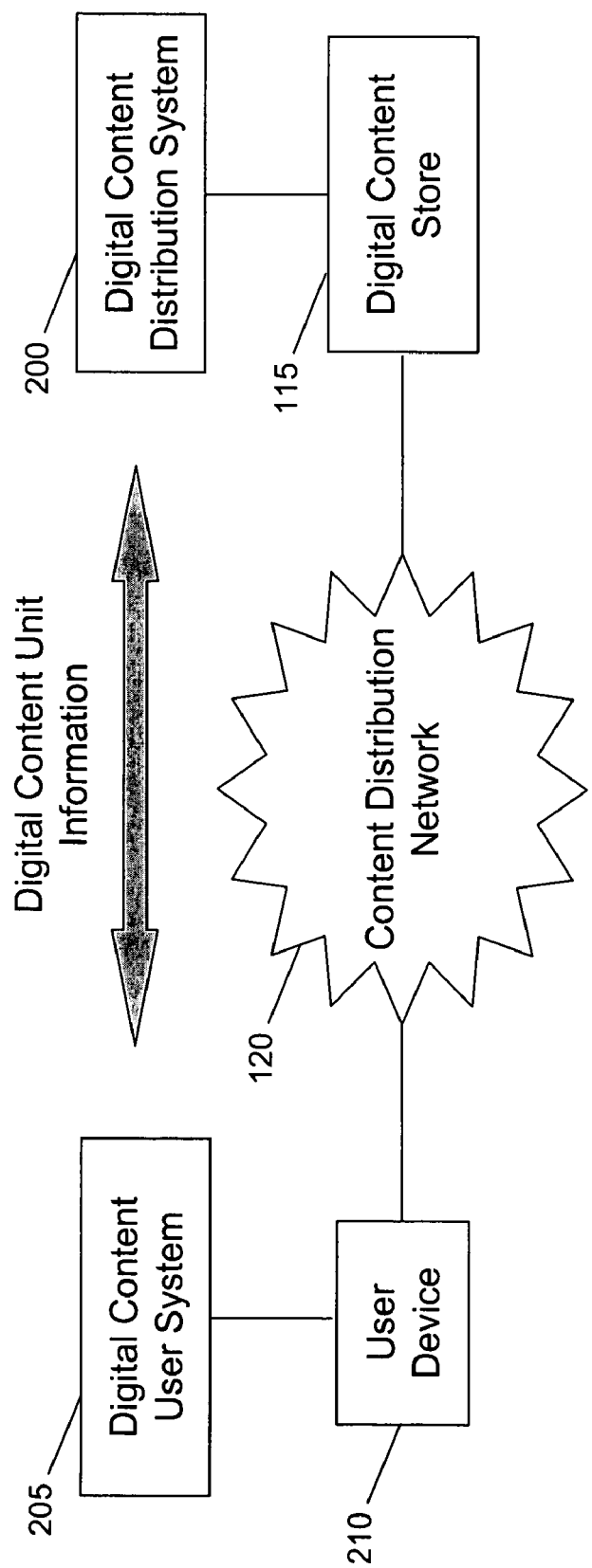
FIG. 2 shows a schematic diagram of an exemplary system for managing digital content according to the principles and embodiments of the present invention.

An exemplary system for managing digital content according to certain exemplary principles and embodiments of the present invention is shown in FIG. 2. Digital content store 115 may include or interact with a digital content distribution system 200. The digital content distribution system 200 may facilitate the distribution of digital content units to users on various user devices capable of accessing the digital content represented in the digital content units. Digital content distribution system 200 may include software routines and associated hardware, e.g., a server, for handling all aspects involved in the distribution of digital content units to users, such as storing digital content units for users' to access, processing users' requests for digital content units, processing users' personal information for, for example, creating users' accounts, and processing users' financial information for handling users' legitimate and/or authorized acquistions of digital content units.

Digital content distribution system 200 may also include one or more software routines and associated hardware for protecting the digital content units provided by digital content store 115. For example, digital content distribution system 200 may include content protection routines applying cryptographic techniques for protecting digital content units, such as, routines for creating and storing encryption and decryption keys and routines for encrypting and decrypting digital content units. As understood by one of ordinary skill in the art, digital content distribution system 200 may also include additional software routines and associated hardware for managing digital content, including routines for communicating with user devices routines for displaying and playing digital content to users, and so on.

Users accessing digital content units provided by digital content distribution system 200 may do so with a digital content user system 205 associated with, placed on, or incorporated into user device 210. For example, users accessing the iTunes Music Store may do so with the use of iTunes client software residing in their user devices. As yet another alternative appropriately configured digital content players may put the digital content under system 205, as in the case of Comcast's Rhapsody program. The digital content user system may be implemented as either hardware or software. Digital content user system 205 may include software routines and associated hardware, e.g., a client, for receiving digital content units from digital content store 115 and enabling its users to access and enjoy the digital content represented in the digital content units. For example, digital content user system 205 may include communication routines for transmitting and receiving information to and from digital content distribution system 200, routines for displaying and playing digital content to users, and routines for organizing digital content units stored in user device 210. Digital content user system 205 may also include content protection routines applying cryptographic techniques for protecting digital content units, such as routines for creating and storing encryption and decryption keys and routines for encrypting and decrypting digital content units, for example, routines for decrypting encrypted digital content units requested and obtained from digital content store 115 by a user of user device 210. Digital content user system 205 may also include additional software routines and associated hardware for managing digital content units.

Digital content store 115 and user device 210 may communicate with each other via content distribution network 120. In particular, digital content distribution system 200 in digital content store 115 may transmit and/or receive digital content unit information to and from digital content user system 205 in user device 210. The digital content unit information may include encrypted digital content units, user information such as user personal and billing information for processing a purchase or acquisition of a digital content unit, as well as information necessary for execution of content protection routines implemented in digital content distribution system 200 and/or digital content user system 205, including encrypt keys, decrypt keys, header information associated with an encrypted digital content unit, hash values, and so forth.

It should be understood by one of ordinary skill in the art that when a user of user device 210 requests a digital content unit from digital content store 115, digital content store 115 typically executes one or more content protection routines to protect the digital content unit. Accordingly, when a user of user device 210 requests, purchases and/or downloads a digital content unit from digital content store 115, digital content distribution system 200 may forward an encrypted digital content unit to digital content user system 205 for digital content user system 205 to decrypt and make the content represented in the digital content unit available for the user to enjoy.

As described hereinabove, digital content user system 205 may include trusted or untrusted software, e.g., a trusted or untrusted client software associated with digital content distribution system 200. A trusted software may be any software that operates as expected within its design and policy and is intended for authorized and trusted users only. A trusted user may be a user authorized to use the trusted software and who does not and is not able to make unauthorized use of the software, make unauthorized attempts to break into the trusted software or offer it illegally to other untrusted users. Alternatively, an untrusted software may not guarantee that it is fully protected against unauthorized use, distribution, break-ins and other unauthorized actions by its users.

Trusted Systems

Figure 3:
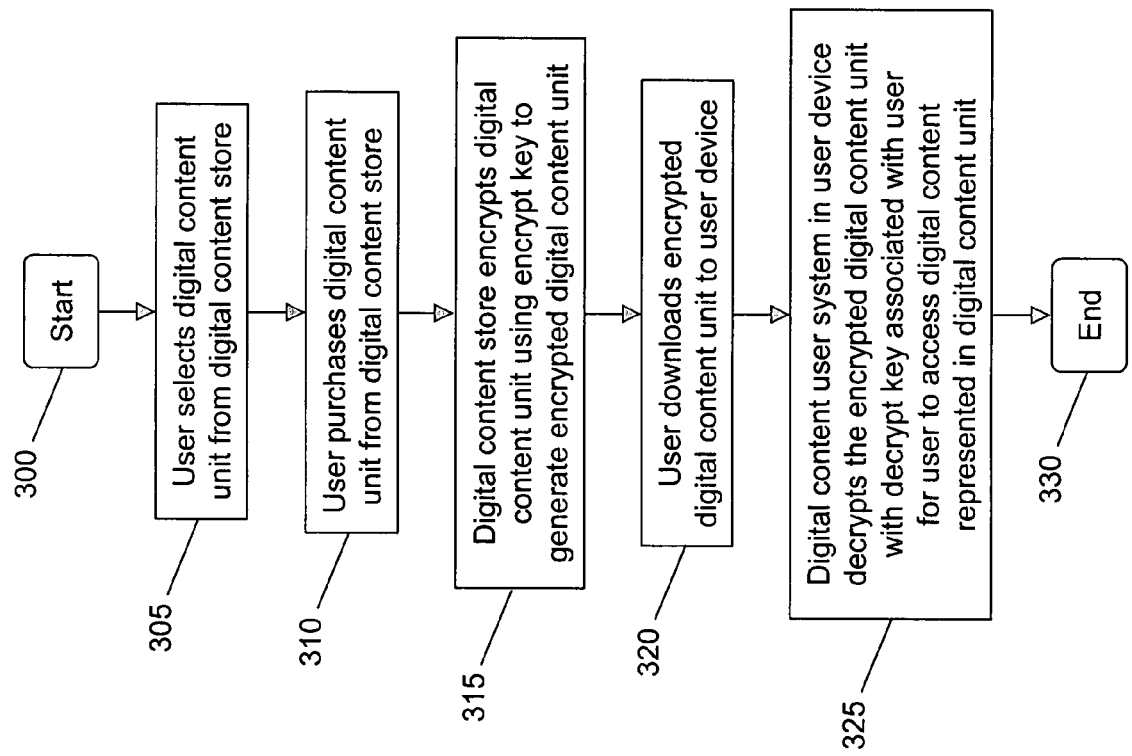
FIG. 3 is a flowchart of an exemplary embodiment of a method according to the present invention for providing an encrypted digital content unit to a trusted digital content user system.

Referring now to FIG. 3, a flow chart of an exemplary embodiment of a method according to the present invention for providing an encrypted digital content unit to a user of a user device having a trusted digital content user system is described. A user of user device 210 having a trusted digital content user system, e.g., digital content user system 205 may select a digital content unit from digital content store 115 at operation 305. This selection operation may, for example, involve the user browsing a selection of digital content units at a web site associated with digital content store 115. The user may be able to view and/or listen to a sample of the digital content unit before selecting the digital content unit for purchase and/or download. Upon making a selection, the user proceeds to purchase and/or obtain the digital content unit from digital content store 115 at operation 310. The purchasing operation may, for example, include the creation of a user account and the transmission of user personal and billing information to digital content store 115 to complete the acquisition.

When the acquisition is finalized, digital content store 115 applies content protection routines to the selected content unit before sending it to the user. For example, at operation 315, digital content store 115 may encrypt the selected digital content unit using an encrypt key to generate an encrypted digital content unit for transmission to the user. In one exemplary embodiment, the encrypt key may be associated with the user, e.g., it may be a part of a secret key technique in which the encrypt key is secret and only known to the user and digital content store 115. In this secret key technique, the encrypt key is associated with a decrypt key that is also secret and only known to the user and digital content store 115. The encrypt key and the decrypt key may be the same key under this technique. In another exemplary embodiment, the encrypt key may be associated with the digital content store, e.g., it be a part of a public key technique, with the caveat that the encrypt key may be a secret key known only to digital content store 115. In this case, the same encrypt key may be used to encrypt all digital content units regardless of the user while a decrypt key unique to each user may be used to decrypt the encrypted digital content units. Alternatively, the encrypt key may be a key associated with the digital content unit.

The user downloads the encrypted digital content unit to user device 210 at operation 320. Digital content user system 205 in user device 210 then decrypts the encrypted digital content unit with the decrypt key associated with the user at operation 325. After decryption of the digital content unit, the user may access the digital content represented in the digital content unit, for example, the user may view or listen to the digital content therein.

Untrusted Systems

Figure 4:
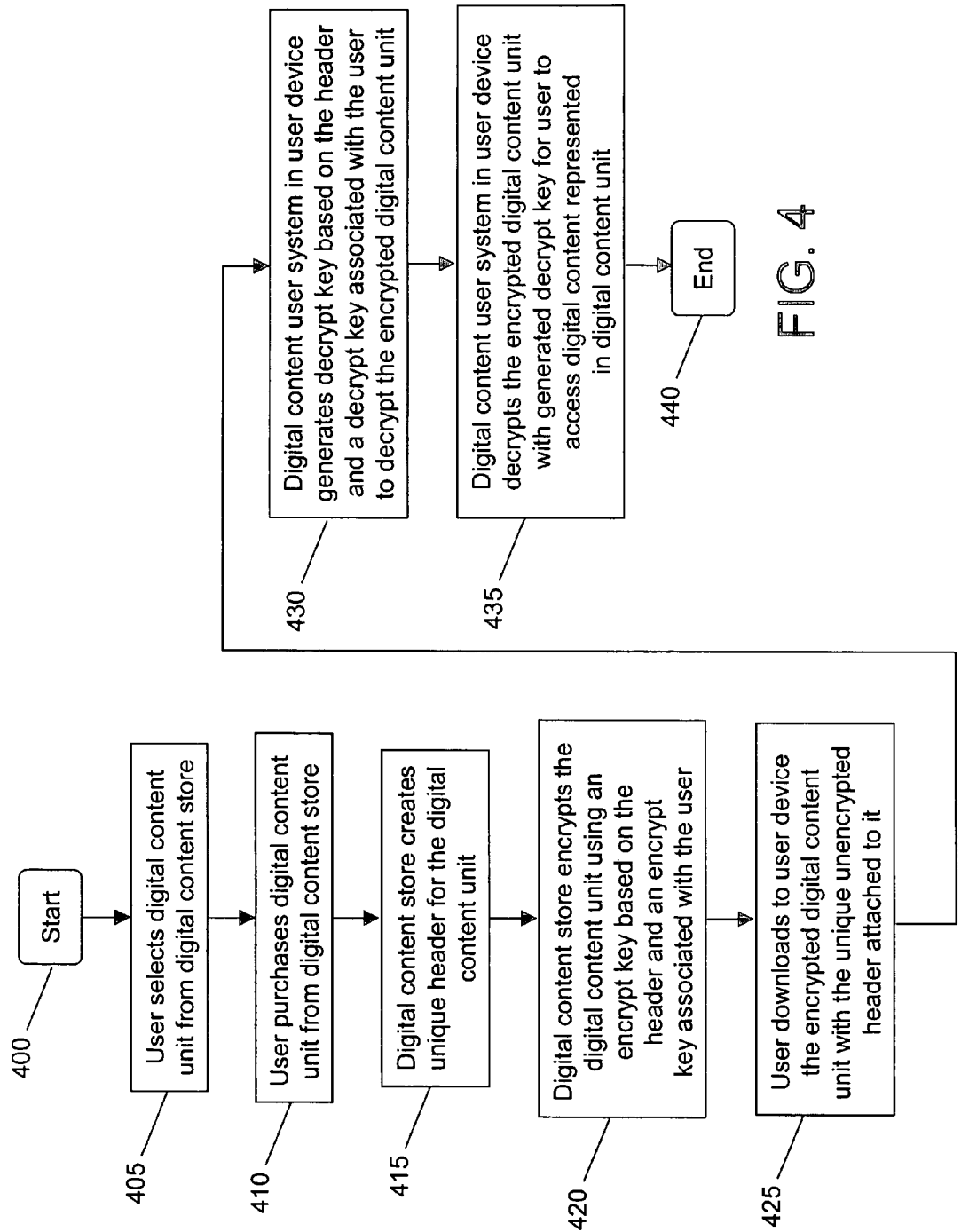
FIG. 4 is a flowchart of an exemplary embodiment of a method according to the present invention for providing an encrypted digital content unit to an untrusted digital content user system.

Referring now to FIG. 4, a flow chart of an exemplary embodiment of a method according to the present invention for providing an encrypted digital content unit to a user of a user device having an untrusted digital content user system is described. A user of user device 210 having an untrusted digital content user system, e.g., digital content user system 205, selects a digital content unit from digital content store 115 at operation 405. This selection operation may, for example, involve the user browsing a selection of digital content units at a web site associated with digital content store 115. The user may be able to view and/or listen to a sample of the digital content unit before selecting the digital content unit for purchase and/or download. Upon making a selection, the user proceeds to legitimately acquire the digital content unit from digital content store 115 at operation 410. The purchasing operation may, for example, include the creation of a user account and the transmission of user personal and billing information to digital content store 115 to complete the acquisition.

When the legitimate acquisition is finalized, digital content store 115 applies content protection routines to the selected digital content unit before sending it to the user. For example, at operation 415, digital content store 115 creates a unique header for the selected digital content unit. With an untrusted digital content user system, a unique header is created for each digital content unit in digital content store 115 prior to be being sent to a user. Next, at operation 420, digital content store 115 creates an encrypt key based on the header and on an encrypt key associated with the user to encrypt the selected digital content unit. This encrypt key may be, for example, a cryptographic hash of the header and the encrypt key associated with the user. Because the header is unique to the digital content unit, each digital content unit has a unique encrypt key associated with it, regardless of the user.

After encryption of the selected digital content unit with the unique encrypt key, the user may download the encrypted digital content unit to user device 210 at operation 425. The encrypted digital content unit has the unencrypted unique header attached to it so that digital content user system 205 in user device 210 may be able to, at operation 430, generate a decrypt key to decrypt the encrypted digital content unit based on the unique header and the decrypt key associated with the user. Alternatively, digital content user system 205 may provide the unencrypted header to digital content store 115 so that digital content distribution system 200 in digital content store 115 may generate the decrypt key and provided it to digital content user system 205. Digital content user system 205 may also retrieve the decrypt key from digital content store 115 after the key is generated by digital content distribution system 200 in digital content store. In the example above, the decrypt key may be a cryptographic hash of the header and the decrypt key associated with the user. The encrypted digital content unit is decrypted with the generated decrypt key at operation 435.

As understood to one of ordinary skilled in the art, the encrypt key and the decrypt key that are associated with the user may be the same key in a secret key technique. In this case, the cryptographic hash of the unique header and the encrypt key may be the same as the cryptographic hash of the unique header and the decrypt key.

For embodiments employing either a trusted digital content user system or an untrusted digital content user system (FIG. 4), the present invention enables a user to obtain one or more rights in a legitimate copy of a digital content unit without having to download the digital content unit. In accordance with the principles and embodiments of the present invention, a user having access to a copy of an encrypted digital content unit may be able to obtain a legal right to access the content therein without having to download another copy of the digital content unit from, for example, a digital content store.

For example, the digital content store may offer the user having access to a copy of an encrypted digital content unit the right to legitimize that copy. The copy may be obtained through any of a number of mechanisms, such as by transmission across a network, copying from another entity, obtaining a storage medium on which the digital content unit (or copy) resides, and so forth. The users may obtain such a right from the digital content store. The right may be obtained for a fee, for other consideration, or for free. (This applies equally to the foregoing description and examples.) As one example, the fee may be a fraction of the fee used to download a digital content unit. Alternatively, the right to access or legitimately have a right in the copy of the digital content unit may be granted for free. The copy of the encrypted digital content unit to which the user has access was originally encrypted and authorized solely for the user who obtained and/or downloaded it from the digital content store, the user may, in effect, when purchasing the right to access the digital content therein, obtain the right to decrypt the copy for his/her own use. This way, if Alice (for example) purchases an encrypted digital content unit (an "original unit") from the digital content store and Bob copies to Alice's encrypted digital content unit (a "copy unit"), Bob may be able to obtain from the digital content store the legal right to access the digital content in the copy unit. Bob may be access the copy unit for his enjoyment even though the copy was encrypted with Alice's key. Thus, Bob may access the digital content in the copy unit without having to download another copy from the digital content store.

Decoupling Downloading and Authorization

Referring now to FIG. 5, a flowchart of an exemplary method for authorizing or legitimizing a copy of a digital content unit (for example, a copy unit) without downloading the digital content unit from a digital content store is shown. At optional operation 505, user A, may download an encrypted digital content unit from digital content store 115 to her user device. The digital content unit may be encrypted according to whether the digital content user system in user A's device is trusted (FIG. 3) or untrusted (FIG. 4), or in another manner entirely. For example, the digital content unit may be encrypted with the "Freeplay" encryption routine previously discussed.

Regardless of how the digital content unit may have been encrypted, a copy of the encrypted digital content unit may be provided to, or otherwise accessed by, user B, at operation 510. For example, user A may provide user B a copy of the encrypted digital content unit or user B may get the encrypted digital content unit through other means. Regardless of how user B obtains the copy unit of the encrypted digital content unit downloaded by user A, user B may not be able to access the content therein because the copy is encrypted to be accessed only by user A. As an example, all or part of the copy unit may be encrypted with a private key corresponding to (and accessible only by) user A. Thus, user B may not be able to legally access the content in the copy unit unless user B is granted access to the appropriate key for decrypting the copy or the copy unit is re-encrypted.

Accordingly, certain embodiments of the present invention enable user B to obtain authorization from digital content store 115 to access the content in the copy at operation 515. Digital content store 115 may, for example, sell the right to access the copy to user B on a per unit fee, as part of a subscription, or in exchange for other valuable services or consideration. (As a single example, digital content store 115 may also provide the right to access the copy to user B for free, for example as an incentive for user B to sign up to other services offered by digital content store 115. As yet another example, the store 115 may provide free authorization, legitimization, or authentication of B's copy unit for a finite period of time.)

As described above, user B may access the content in the copy by first decrypting the copy with the appropriate key. Thus, at operation 520, the digital content user system in user B's device, e.g., digital content user system 205, communicates with digital content distribution system 200 in digital content store 115 to find the appropriate decrypt key to decrypt the copy.

In the case of a trusted digital content user system, the appropriate decrypt key to decrypt the copy may be, for example, a key associated with another user, i.e., the user who downloaded the original unit of the encrypted digital content unit from digital content store 115. Because this decrypt key is typically accessible by the digital content store 115, the trusted digital content user system in user B's device may communicate with digital content distribution system 200 to retrieve the decrypt key from digital content store 115. Alternatively, digital content distribution system 200 may provide the decrypt key to the trusted digital content user system in user B's device.

As yet another alternative, the digital content store 115 may maintain control of the other user's decrypt key. In this alternative embodiment, the decrypt key is not passed from the digital content store to user B's device. Instead, at least the encrypted header of the copy unit is transmitted from user B's device to the digital content store. The digital content store may then employ user A's key to decrypt the header.

That is, the appropriate decrypt key to decrypt the copy may be, for example, a key based on (or contained in) the unique header attached to the encrypted digital content unit (and to the copy thereof) and a key associated with user A, i.e., the user who downloaded the encrypted digital content unit from digital content store 115. Again, because user A's decrypt key is accessible by the digital content store 115, user B's digital content user system may, for example, communicate with digital content distribution system 200 (or directly to the store) to provide digital content distribution system 200

(or the store) with the encrypted header so that digital content distribution system 200 may verify that the header indeed corresponds to the encrypted digital content unit downloaded by user A. This may be done, for example, by employing user A's key to decrypt the header or by comparing the encrypted header to a record of digital content units in which user A has a right in order to determine whether the encrypted header matches a digital content unit in user A's possession.

Based on the header, digital content distribution system 200 may retrieve the decrypt key from the header by employing user A's key. For example, the decrypt key may be a cryptographic hash of the header and the decrypt key associated with user A. The digital content user system in user B's device may then retrieve the decrypt key from digital content store 115. Alternatively, digital content distribution system 200 may provide the decrypt key to the digital content user system in user B's device. As yet another alternative, the digital content store 115 or distribution system 200 may re-encrypt the header with user B's key and return an encrypted header, thus preventing user B or any device associated with him from ever obtaining user A's key.

After obtaining the appropriate decrypt key to decrypt the copy, the digital content user system in user B's device may decrypt the copy unit, and at operation 525, re-encrypt it with an encrypt key associated with user B to generate a legitimate copy of the digital content unit for user B to enjoy. Alternatively, operation 525 may be performed by the digital content store 115 or digital content distribution system 200. In such embodiments, the entire copy unit may be transmitted to the store or system, or simply the header of the copy unit may be so transmitted.

As described hereinabove, one of ordinary skill in the art should understand that the legitimate copy may be generated without user B having to download the digital content unit from digital content store 115. It should also be understood by one skilled in the art that the present invention may be used in any application requiring a way to transform an encrypted digital content unit that is encrypted with a key intended for a user, system, or device A into another encrypted digital content unit that is encrypted with a key intended for a user, system, or device B.

Transcryption

As yet another option, the digital content store 115 may transcrypt the copy unit to produce a legitimized or authorized copy of the digital content unit. Since the digital content store 115 stores and has access to both user A's decryption key and user B's decryption key, the store may employ both keys to generate a method or routine for converting a header (or digital content unit) encrypted with user A's key into a header (or digital content unit) encrypted with user B's key. This is commonly called "transcryption."

Transcryption may be illustrated by a simple example. Suppose that user A and user B both have relatively simple keys: user A adds five to the value of every encrypted bit to obtain decrypted data, while user B adds three to the value to every encrypted bit to decrypt. Since the digital content store 115 may access both keys, it may compare the two in order to determine a relationship between the keys. In the present example, instead of decrypting the digital content unit with user A's key and re-encrypting it with user B's key, the digital content store 115 (or distribution system 200) may simply subtract two from the value of each bit encrypted with user A's key. This would result in a digital content unit that, when decrypted with user B's key, provides the same data obtained by user A prior to the transcryption.

By employing both user A's key and user B's key to determine the operations necessary to change the data encrypted with user A's key into data that may be decrypted with user B's key, the exemplary embodiment may avoid performing two operations when one may suffice. Thus, transcryption may take the place of decryption of a digital content unit (such as a copy unit) with user A's key and re-encryption with user B's key. This, in turn, may reduce the time, processing power, hardware requirements, bandwidth for transmissions, and so forth associated with various embodiments of the present invention. The implementation of such transcryption includes not only transcryption routines known now, but those hereafter discovered or created.

Watermarks

In addition, one or more digital watermarks may be employed by various embodiments of the present invention. A digital watermark (or simply "watermark") may take the form of one or more bits or bytes stored in a digital content unit. Typically, although not necessarily, the watermark is included in the header of the digital content unit. In alternative embodiments, the watermark may be included in the data of the digital content unit.

The watermark(s) may serve to establish a chain of ownership or authorization. Each time a user authorizes or legitimizes a version of a digital content unit, the watermark(s) may record the transaction. Thus, the watermark may effectively recount the history of a digital content unit and permit the digital content store 115, distribution system 200, or another entity to trace the users from which the digital content unit in question was obtained.

According to one exemplary embodiment of the present invention, a first watermark may be added to a digital content unit when the unit is initially obtained from the digital content store 115. The first watermark contains information identifying the user who initially obtained the digital content unit ("user 1"). User 1 may pass a copy of the digital content unit to user 2, who may then employ one of the methods, systems, and/or apparatuses described elsewhere herein to authorize his copy unit.

When user 2 authorizes his copy unit, a second watermark may be added to the copy unit. (The copy unit contains the first watermark since it is a copy of the original unit.) The second watermark contains information identifying user 2. If user 3 obtains a copy unit from user 2 and subsequently authorizes this second copy unit (i.e., the copy of the copy), a third watermark identifying user 3 may be added. This may continue indefinitely.

In alternative embodiments, a single watermark may be employed, as may a fixed maximum of watermarks. The single watermark (or one or more of the fixed maximum) may be updated each time a copy unit is authorized and thus contain the history of the copy unit/digital content unit.

Alternatively, the historical information may be stored at the digital content store 115 or distribution system 200 as records in a database, and each watermark may simply serve as a pointer to a record in the database.

By adding watermarks to digital content units, certain enhancements to the various embodiments discussed herein may be possible. For example, a digital content store 115 may be set up to provide free authorization of a copy unit (or a free download of an original unit) or other remuneration to a user who widely distributes copies of a particular digital content unit. This may be desirable, for example, where the digital content unit is a form of marketing such as a free audio track of a band, a commercial, a form of "viral marketing," and so forth. The digital content store 115 may count the number of copy units having a watermark attributable to a particular user and provide the free authorization or download when the count exceeds a minimum.

As yet another enhancement, a user may receive a payment for each copy unit authorized that includes a watermark identifying the user. As a single, non-limiting example, the user may receive a fraction of the authorization fee charged by the digital content store 115 for authorizing the copy unit to another user. The user may receive such payment for any copy unit that is authorized and has a watermark identifying the user. Alternatively, the user may receive payment only if the watermark indicates the user was within a certain number of steps away from the copy unit being authorized. For example, a user may receive payment only where his watermark is the last or next-to-last watermark in the copy unit being authorized. As yet another example, the user may receive diminishing payments the further back in the history chain his watermark is.

Still another embodiment may refuse to authorize a copy unit if the number of copy units having a specific watermark exceeds a threshold. For example, a digital content store 115 may only authorize one hundred copies of a digital content unit having a particular watermark therein.

Multiple Random Keys

It should be noted that certain methods and embodiments described above, when used in a system having both a user-linked or -associated key and a random key (such as the Fairplay system) may employ a single random key that persists across both an original unit and all copy units. That is, when certain embodiments described above operate in a system like Fairplay, they generally decrypt the header with user A's key and re-encrypt it with user B's key. The random key associated with the original unit and stored in the header may not change.

In alternative embodiments of the present invention, the random key associated with the digital content unit—as opposed to a user key—may also be changed. The digital content store 115, distribution system 200, or user device may generate a second random key during, before or after decrypting the header/digital content unit with user A's key, re-encrypting the header/digital content unit with user B's key, or transcryption. The second random key may be employed to encrypt the data in the digital content unit and may be stored in the header prior to encryption of the header with user B's key (or transcryption of the header). This may add an additional layer of security to digital content units.

Fee Structures

By decoupling the authorization of a digital content unit from the download of a digital content unit, bandwidth and/or transmission charges may be reduced for the digital content store 115. In this manner, the operator of the digital content store may reduce the operating expenses of the store while maintaining revenue streams.

This reduction in operating expenses may facilitate a two-tier pricing structure. For example, the digital content store 115 may charge a first price to users who download a digital content unit from the store and a second price to users who authorize a digital content unit without downloading the unit. Thus, to continue the example, some portion of the cost savings to the digital content store 115 may be passed along to a user authorizing a copy unit.

As a more specific example, the digital content store 115 may charge $1 for a user to download an authorized copy of a digital content unit. The same store 115 may charge 50 cents to authorize a copy unit without downloading the entire digital content unit from the store. This may encourage users to trade or copy digital content units as well as authorize these copies. Such sharing may, in turn, reduce piracy or illegal copying since the opportunity cost of having one or more rights in an authorized copy of the digital content unit may be reduced.

Partial Authorization

Certain embodiments of the present invention may contain yet further features. For example, a user may have multiple choices in how to authorize a given digital content unit. A user may pay a first fee to completely authorize a digital content unit or a second, and presumably lesser, fee to only partially authorize a digital content unit. Presumably, although not necessarily, the digital content unit being authorized is a copy unit.

Partial authorization of a copy unit may come in many forms. A user may authorize a copy only for a particular right or rights. A user may authorize a digital content unit for a set time period. A user may authorize a digital content unit for an unlimited time, but foregoing the right to make any copies of the unit. A user may authorize a digital content unit to be replayed only in a particular medium or at certain times. All of these authorizations are examples of partial authorization. Additionally, alternative embodiments of the invention may permit a user to partially authorize a digital content unit and later add additional partial authorization to that same digital content unit. For example, a user may authorize a digital content unit for a set period of time, then later authorize the same digital content unit for additional time. Alternatively, the user may authorize a digital content unit for playback or presentation, and later authorize that same unit for distribution. A watermark may likewise be updated or additionally provided each time a partial authorization is obtained.

The foregoing descriptions of specific embodiments and best mode of the present invention have been presented for purposes of illustration and description only. They are not intended to be exhaustive or to limit the invention to the precise forms disclosed. Specific features of the invention are shown in some drawings and not in others, for purposes of convenience only, and any feature may be combined with other features in accordance with the invention. Operations of the described processes may be reordered or combined, and other operations may be included. The embodiments were chosen and described in order to best explain the principles of the invention and its practical application, to thereby enable others skilled in the art to best utilize the invention and various embodiments with various modifications as are suited to the particular use contemplated. Further variations of the invention will be apparent to one skilled in the art in light of this disclosure and such variations are intended to fall within the scope of the appended claims and their equivalents.

What is claimed is:

1. A method for authorizing a copy of a digital content unit to a first user's device without downloading the copy from a digital content store, the method comprising:

obtaining, by the digital content store, information related to an encrypted copy of the digital content unit associated with a second user, the encrypted copy of the digital content unit encrypted with a first encrypt key associated with the second user and having a first set of permissions permitting access to a first portion of the digital content unit;

storing, by the digital content store, the first encrypt key;

providing, from the digital content store, a right to obtain a legitimate copy of the digital content unit and a second set of permissions permitting access to a second portion of the digital content unit, wherein the first set of permissions and the second set of permissions differ; and generating, by the digital content store, the legitimate copy of the digital content unit from the encrypted copy of the digital content unit, wherein generating the legitimate copy of the digital content unit comprises:

decrypting by the digital content store the encrypted copy of the digital content unit using the first encrypt key to generate a decrypted copy of the digital content unit; and encrypting by the digital content store the decrypted copy of the digital content unit with a second encrypt key associated with the first user; and storing, by the digital content store, the second encrypt key providing a first decrypt key associated with the second user to a first user's device for generating the decrypted copy of the digital content unit; wherein the first decrypt key comprises a cryptographic hash of a header of the digital content unit and the first decrypt key associated with the second user's device.

2. The method of claim 1, wherein obtaining information related to an encrypted copy of the digital content unit comprises receiving a request to authorize the encrypted copy of the digital content unit.

3. The method of claim 2, further comprising providing access to the encrypted copy of the digital content unit to the first user's device.

4. The method of claim 3, wherein providing access to the encrypted copy of the digital content unit to the first user's device comprises attaching an at least partially-encrypted header to the encrypted copy of the digital content unit.

5. The method of claim 4, wherein the at least partially-encrypted header contains a key unique to the copy of the digital content unit.

6. The method of claim 5, wherein the first encrypt key comprises a cryptographic hash of the header and the first decrypt key associated with the second user.

7. The method of claim 1, wherein providing the first decrypt key to the first user's device for decrypting the encrypted copy of the digital content unit comprises retrieving the first decrypt key associated with the second user from the digital content store.

8. The method of claim 1, wherein a second encrypt key is associated with the first user's device.

9. The method of claim 1, wherein the first set of access permissions remains unchanged after generating the legitimate copy of the digital content unit.

\* \* \* \* \*